Jan. 13, 1953     C. C. FUERST     2,625,088
SHUTTER OPENING DEVICE FOR FOCUSING
Filed March 8, 1951
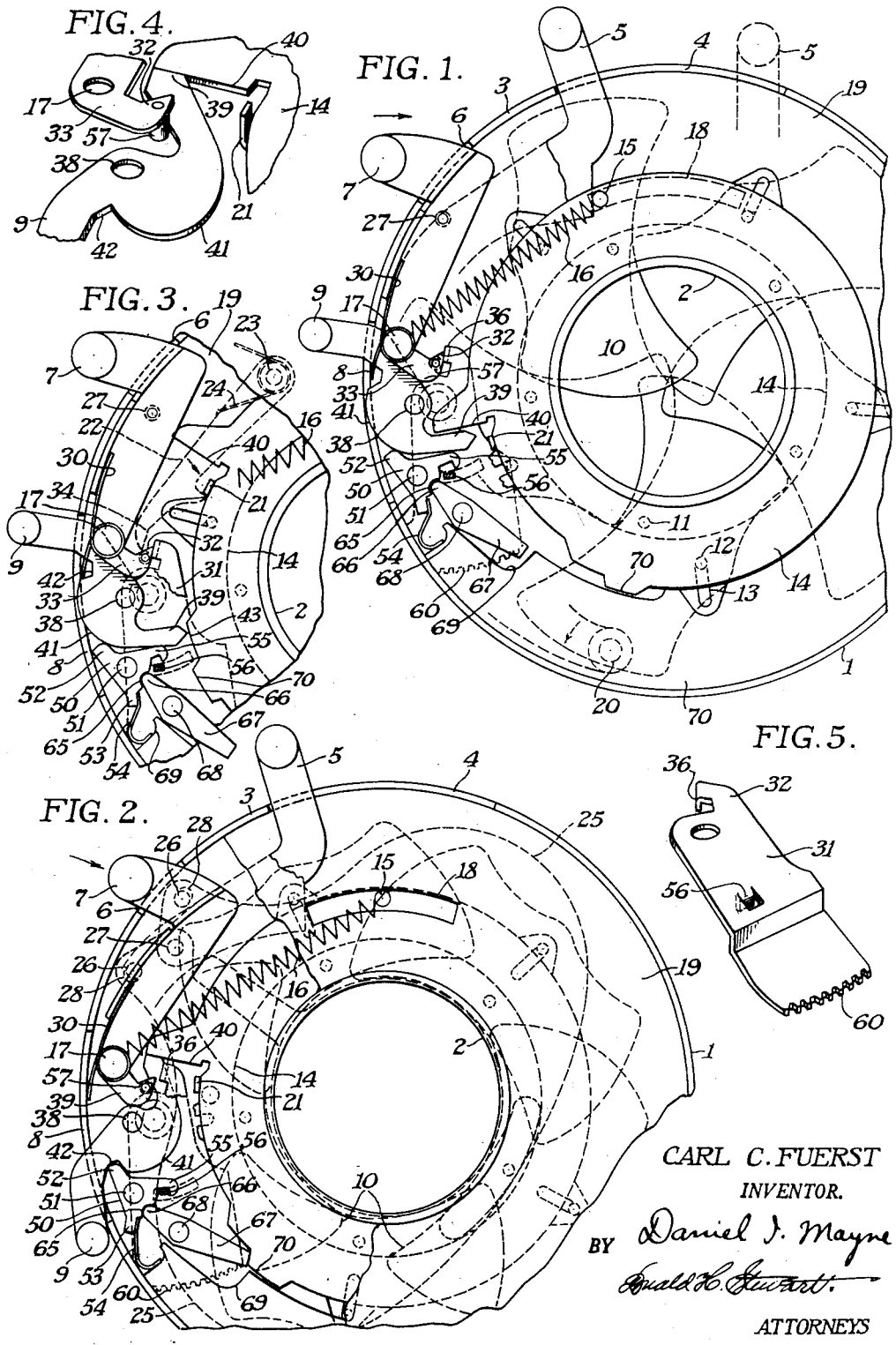
CARL C. FUERST
INVENTOR.
BY Daniel J. Mayne
Donald H. Stewart
ATTORNEYS Patented Jan. 13, 1953

2,625,088

UNITED STATES PATENT OFFICE 2,625,088

SHUTTER OPENING DEVICE FOR FOCUSING

Carl C. Fuerst, Rochester, N. Y., assignor to Eastman Kodak Company, Rochester, N. Y., a corporation of New Jersey Application March 8, 1951, Serial No. 214,608

4 Claims. (Cl. 95—63)

This invention relates to camera shutters, and particularly to camera shutters of the type in which shutter blades and cover blinds are employed. One object of my invention is to provide a shutter of the type described, with a blade-opening device which opens both the shutter blades and the cover blinds so that focusing may be accomplished without altering the setting of the shutter. Another object of my invention is to provide a shutter-opening device for focusing in which a mechanism prevents the shutter from being moved to a set position while the shutter blades are open for focusing. Still another object of my invention is to provide a shutter blade opening mechanism which can only be operated when the shutter parts are in a rest position. A still further object is to provide a shutter mechanism in which both the opening and the closing movements are accomplished by means of a single lever, which may be moved in one direction for opening the shutter for focusing, and in another direction for closing the shutter blades after focusing has been accomplished. Other objects will appear from the following specification, the novel features being particularly pointed out in the claims at the end thereof.

For a shutter of the general type to which my improved opening mechanism may be applied, reference may be had to my copending application, Serial No. 189,031, filed October 7, 1950, entitled "High Speed Shutter."

Coming now to the drawings wherein reference characters denote like parts throughout:

Fig. 1 is a front elevation of a shutter with a cover and a part of the mechanism removed to show a preferred embodiment of my shutter-opening mechanism. This figure illustrates the position of the parts when the shutter is in a rest, or unset, position.

Fig. 2 is a view similar to Fig. 1, but with the shutter blades and cover blinds shown in a fully open, or focusing, position.

Fig. 3 is a fragmentary view, otherwise similar to Figs. 1 and 2, but showing certain shutter parts in the position they assume when the shutter is set.

Fig. 4 is a fragmentary detail in perspective, showing portions of the shutter trigger, focusing lever and blade ring.

Fig. 5 is a perspective view of the shutter power release segment for releasing the shutter mechanism to make an exposure.

In the shutter shown in my copending application, above referred to, the shutter mechanism is of a type employing a plurality of pivotally mounted shutter blades adapted to turn in one direction to open and close an exposure aperture. This type of shutter requires a pair of cover blinds which cover the exposure aperture during the time that the shutter is set so that an exposure can only be made when these blades have been opened.

In the present instance, this type of shutter is employed. The shutter may consist of a shutter casing 1, having a central exposure aperture 2. A flange 3 extends around the periphery of the shutter casing, this flange being slotted at 4 so that a setting lever 5 may move through this slot to tension a shutter spring. There is a second cut-out 6 in the flange 3, through which a shutter trigger 7 may project. There is also a third cut-out 8 in the flange 3 of the shutter, through which the opening lever 9 may project. As with the shutter shown in the above-mentioned application, the present shutter includes a plurality of shutter blades 10, each blade being pivotally mounted at 11 to the shutter casing, and each blade including a pin 12 and slot 13 connection with a blade ring 14, which may be moved to drive the shutter blades.

The blade ring 14 includes an upstanding pin 15 connected by a coil spring 16 to a stud 17 so that when this spring 16 is tensioned, the pin 15 is moved to the right-hand end of a slot 18 in a mechanism plate 19 and is in a position to drive the shutter blades. To set the shutter, the setting lever 5, which is pivoted on a stud 20 near the bottom of the shutter, is moved from the position shown in full lines in Fig. 1 to the dotted line position in Fig. 1, at which time the blade ring 14 is latched, Fig. 3, through the engagement of a lug 21, carried by the blade ring, and a latch 22 pivoted at 23 to a mechanism plate and pressed by a spring 24 in the directions shown by the arrow in Fig. 3. When the shutter is set, the latch elements 21 and 22 are engaged, and the handle 5 of the setting lever may return to its rest position in Fig. 1. A spring (not shown) tends to hold the setting lever 5 in its rest position and to move this lever about the stud 20 in the direction shown by the arrow in Fig. 1.

As the blade ring 14 moves from its rest position, Fig. 1, to its set position, the blades 10 open and close. To prevent light from entering the exposure aperture during this setting movement, a pair of cover blinds 25 are employed, these cover blinds being pivoted on a pair of spaced studs 26, and being interconnected by pin 27. Each cover blind is provided with an elongated aperture 28 which may slide on the pins 26 as the connecting pin 27 moves from a position to one side of the pins 26 to a position on the other side of the pins 26 to move the cover blinds.

The pin 27 is carried by the shutter trigger 7, and consequently, when this lever is moved in the direction shown by the arrow in Fig. 2, the pin moves between the pivots 26 of the cover blinds 25 and causes these cover blinds to move to their open position shown in Fig. 2. A spring 30 surrounds the trigger pivot 17 and tends to hold the trigger outwardly in its Fig. 1 position. Thus, when an exposure is to be made and the trigger 7 is moved inwardly, the cover blinds 25 are moved to an open position and a power-operated release element 31, shown in Fig. 5, is released, since a hook 32 on arm 33 of the shutter trigger is moved out of the path of a lug 36 so that a spring (not shown) may drive the power-driven element 31 in a counter-clockwise direction. By moving in this direction, the lug 36 may strike the end 34 of the release latch 22, thereby moving this latch in a clockwise direction about its pivot 23 and against the pressure of spring 24. This causes the upstanding lug 21 on the blade ring 14 to be released so that the blade ring may move in a counterclockwise direction, thereby opening and closing the blades 10 to make an exposure.

In order to open the shutter blades and the cover blinds so that an operator may focus on a ground glass, there is a third lever 9 projecting from the shutter casing 1 through the slot 8. This lever may be called the focusing lever, and it consists of a generally S-shaped metal part mounted to turn on a stud 38. The lever includes a projecting arm 39 which may engage a flat surface 40, as shown in Fig. 2 on the blade ring 14. It also includes a cam 41 and a recess 42 at the end of the cam.

The arm 39, as shown in Fig. 3, may lie in a position of rest in which a projection 43 on the blade ring 14 prevents the focusing lever 9 from being turned about its pivot 38. This position takes place only when the shutter is in a set position in which the spring 16 is tensioned and the blade ring 14 is latched against movement through the latch element 22 and the upstanding lug 21. It is, therefore, necessary for the shutter to be in a rest or unset position before the focusing lever 9 can be operated. Such a position is shown in Fig. 1. In this position the arm 39 lies almost parallel with the flat surface 40 of the blade ring 14. If the opening lever 9 is moved in a counterclockwise direction about its pivot 38, the arm 39 will swing the blade ring 14 from the Fig. 1 position to the Fig. 2 position in which the shutter blades are fully open.

It is necessary to prevent the power-operated segment 31 from moving to release the shutter while this operation is going on, and it is also necessary to move the trigger so that the cover blinds 25 will be moved to an open position. In order to do this, the following mechanism is employed. A latch element 50 is pivoted at 51 to the mechanism plate, and this lever includes an arm 52, which rests against the cam surface 41. A second arm 53 is pressed by a spring 54 in a clockwise direction, since this keeps the arm 52 and the cam 41 in contact. The lever includes a third arm 55 in the form of a hook. This hook is positioned to engage a downturned lug 56 on the power-operated element 31. Consequently, as the focusing lever 9 is moved, lever 50 is moved, and the hook 55 will engage the upstanding lug 56 before this power-operated element 31 has a chance to move and release the shutter. Arm 39, in continuing its swinging movement, may engage a pin 57 on the hook-like end 32 of the trigger to swing this trigger from its Fig. 1 to its Fig. 2 position. As this is done, the pin 27, carried by the lever, moves between the pivots 26 of the two shutter blades and causes them to open.

The parts are retained in the open, or Fig. 2, position and, after focusing has been accomplished, the opening lever 9 may be moved from its Fig. 2 to its Fig. 1 position, which will permit the spring 16 to move blade ring 14 and thereby move the shutter blades 10 to their original rest position, as shown in Fig. 1.

The latch element 50 is also provided with a notch 65, in which the end 66 of a blade ring latch element 67 may rest so that as the latch element 50 is moved by the focusing lever 9, this second latching lever 67 will be moved. Lever 67 is pivoted at 68, and when the parts lie in their inactive position, as shown in Fig. 1, lever 67 lies in a cut-out 69 in the mechanism plate 19. Thus, the blade ring 14 is free to move, and there are no obstructions for the shoulder 70 of the blade ring as it moves past the second latch element 66. However, when the focusing lever 9 is moved from its Fig. 1 position to its Fig. 2 position in which the blades 10 are held in a fully open position, the abutment 70 can only turn until it reaches the second pivoted stop 67, because lever 67 will have been moved with the focusing lever to its Fig. 2 position in which it will lie in the path of the shoulder 70. Thus, the blade ring will be held in a position in which the shutter blades are fully open but they cannot be turned further as would occur if an attempt were made to set the shutter by moving the setting lever 5. After the focusing has been accomplished and the focusing lever 9 moved from its Fig. 2 position to its Fig. 1 position, the parts will be restored to the Fig. 1 position and the spring 16 will move the blade ring 14 to close the shutter blades 10. The shutter may then be set in the normal manner by moving lever 5 in a clockwise direction.

It should be noted that when the opening lever 9 is moved to its Fig. 2 position, the pressure of the surface 40 of the blade ring against arm 39 of the opening lever is such that the parts will be retained with the blades in an open position. When moved to their position of rest, the focusing lever and the associated parts do not in any way interfere with the normal operation of the shutter blades and cover blinds.

From the above description, it will be noticed that the operation of this shutter is extremely simple. With the parts at rest, as shown in Fig. 1, if an operator wishes to focus, the focusing lever 9 may be moved from the Fig. 1 to the Fig. 2 position. This movement accomplishes the following functions: first, the arm 39, through engagement with the surface 40 of the blade ring 14, opens the shutter by moving the blade ring and the shutter blades 10 about their pivot 11 and, second, movement of the focusing lever 9 causes cam 41 to ride along arm 52 of lever 50, and this arm may lock into the recess 42 near the end of the movement of focusing lever 9, at which time the hook 55 will engage the upstanding lug 56 of the power-operated element 31 through the action of spring 54. This will lock the power-operated release so that it cannot move far enough for the lug 33 to engage the hook 22, therefore, it cannot release the latch elements 22 and 21. Third, it will cause the arm 39 of the focusing lever 9 to engage pin 57 of the trigger 7 (Fig. 4), moving the trigger from its Fig. 1 to its Fig. 2 position, in which the cover blinds 25 are separated after pin 27 moves between the two pivots 26, and the blinds are moved to their outermost position, shown in Fig. 2. Thus, the single movement of the focusing lever quickly and easily accomplishes the above three functions and, in addition, the parts are retained in the Fig. 2 position until the lever 9 is swung in a clockwise direction to reverse its action, permitting the shutter blinds to close as the blade 14 moves to its rest position of Fig. 1.

If desired, the power-operated element 31 may be provided with teeth 60, which may operate a further retarding device, such as the pallet, with or without additional gears shown in my copending application above referred to. However, this additional retarding action is not always necessary, and may be omitted, as in the present instance.

From the above specification, it will be seen that I have provided a perfected embodiment of my invention, and one which is well adapted to meet the conditions of practical use. As various possible improvements may be readily made, and as various changes may be made in the embodiments above set forth, it is to be understood that all the matter herein set forth or shown in the accompanying drawings is to be interpreted as illustrative only, and not in a limiting sense.

Having thus described my invention, what I claim is new and desire to secure by Letters Patent of the United States is:

1. An improvement in shutter construction for opening the blades of a shutter for focusing wherein the shutter is of the type having an apertured shutter casing, a plurality of shutter leaves pivotally mounted therein, a blade ring movable in one direction for moving the blades in one direction to open and close the exposure aperture, a spring driving the blade ring from a set position to a rest position to make an exposure, means for tensioning the spring thereby setting the shutter, mechanism for releasing the shutter including a trigger and a power-operated shutter release lying in the path of and adapted to be moved by the trigger, and cover blinds connected to and operable through movement of the trigger, said improvement for opening the shutter to a focusing position comprising a manually operable focusing lever pivoted inside the shutter and having an operating handle outside thereof, an arm carried by the focusing lever, a cam carried by the focusing lever, an abutment carried by the blade ring and normally lying adjacent the arm when the blade ring is in a rest position and lying in the path of movement of the arm and adapted to be moved thereby to open the shutter blades, said trigger including a pin lying in the path of movement of the arm and adapted to be moved thereby, a blade ring latch movable to and from a position in which the latch may engage a latch element carried by the blade ring for holding the blade ring against movement when in a set position, a power-operated release including a latch element and including means for moving said blade ring latch, a power-operated release latch pivotally mounted in the shutter and movable to and from a position to engage the power-operated release latch element to hold the latter against movement, said power-operated release latch being spring-pressed against the cam on the focusing lever to be moved thereby, said cam and power-operated release latch being positioned and arranged to engage the latch with the power-operated release latch before the arm completely moves the trigger to its shutter-releasing position.

2. The improvement in shutters for opening the blades of a shutter for focusing as defined in claim 1 characterized in that there is a second blade ring latch element engaging and moving with the power-operated release latch and movable thereby to and from a blade ring blocking position, a lug on the blade ring for engaging the second blade ring latch when the blade ring is moved to a blade open position and the focusing lever has moved the second blade ring latch to its blocking position, said second blade ring latch element being moved to a blade ring blocking position by the power-operated release latch before the blade ring is moved to its blade open position by the focusing lever.

3. The improvement in shutters for opening the blades of a shutter for focusing as defined in claim 1 characterized in that there is a means for preventing the setting of the blade ring to a tension position while the focusing lever is in an operative position comprising a second blade ring latch in the form of a pivoted lever, a spring for moving one end of the pivoted lever toward a blade ring blocking position, the other end of the lever engaging and moving with the power-operated shutter release latch, the power-operated shutter release latch moving to engage the power-operated shutter release and moving the second blade ring latch to its blade ring blocking position as the focusing lever is moved and a lug on the blade ring for engaging the second blade ring latch when the focusing lever has moved the blade ring to a blade open position.

4. An improvement in shutter construction for opening the blades of a shutter for focusing wherein the shutter is of the type having an apertured shutter casing, a plurality of shutter leaves pivotally mounted therein, a blade ring movable in one direction for moving the blades in one direction to open and close the exposure aperture, a spring connected to the shutter and blade ring for driving the blade ring from a set position to a rest position to make an exposure, means for setting the power spring, mechanism for releasing the shutter including a trigger and a power-actuated shutter release lying in the path of and adapted to be moved by the trigger, and cover blinds connected to the trigger and operable through movement of the trigger to open the exposure aperture, said improvement for opening the shutter to a focusing position comprising a manually operable focusing lever pivoted inside the shutter casing and having an operative handle on the outside thereof, an abutment carried by the blade ring having a normal position of rest adjacent the focusing lever, the focusing lever having a rest position in which it is inactive and including an arm normally lying adjacent to and substantially parallel with the abutment on the blade ring and being adapted to engage and move the abutment when the focusing lever is moved about its pivot, a first latch element adapted to hold the blade ring in a set position through engagement with a coacting latch element on the blade ring, a second latch element for the blade ring having an operative and an inoperative position, a shoulder on the blade ring for engaging the second latch when the second latch element is in its operative position and the blade ring is in a blade open position, thereby preventing the blade ring from moving the necessary distance beyond the blade open position to engage the first blade ring latch, a power-operated release including a latch element, a power-operated release latch having a hook movable to and from a position for engaging the power-operated release latch, said power-operated release latch including a cam follower, a cam on the focusing lever, a spring holding the cam follower against the cam whereby the power-operated release latch may be operated by the cam after the focusing lever moves, the cam and arm on the focusing lever being so positioned that the arm may engage and move the blade ring before the power-operated latch is engaged with the power-operated release latch element and the second blade ring latch is moved to a blade ring blocking position, thereby preventing the blade ring from moving to a position to engage the first blade ring latch, and preventing the setting of the shutter when the focusing lever has been moved out of its rest position.

CARL C. FUERST.

REFERENCES CITED

The following references are of record in the file of this patent:

UNITED STATES PATENTS

| Number | Name | Date |
|---|---|---|
| 2,344,382 | Aiken | Mar. 4, 1944 |
| 2,354,168 | Aiken | July 18, 1944 |
| 2,412,681 | Fuerst | Dec. 17, 1946 |
| 2,483,025 | Schwarz | Sept. 27, 1949 |